United States Patent
Pullini

(10) Patent No.: US 8,975,319 B2
(45) Date of Patent: Mar. 10, 2015

(54) METHOD FOR PRODUCING NANOCOMPOSITE MATERIALS WITH POLYMERIC MATRIX, AND CORRESPONDING NANOCOMPOSITE MATERIALS

(75) Inventor: Daniele Pullini, Orbassano (IT)

(73) Assignee: C.R.F. Societa Consortile per Azioni, Orbassano (Torino) (IT)

( * ) Notice: Subject to any disclaimer, the term of this patent is extended or adjusted under 35 U.S.C. 154(b) by 383 days.

(21) Appl. No.: 13/322,322

(22) PCT Filed: Jul. 11, 2011

(86) PCT No.: PCT/IB2011/053077
§ 371 (c)(1),
(2), (4) Date: Nov. 23, 2011

(87) PCT Pub. No.: WO2012/011016
PCT Pub. Date: Jan. 26, 2012

(65) Prior Publication Data
US 2012/0184655 A1    Jul. 19, 2012

(30) Foreign Application Priority Data
Jul. 19, 2010    (IT) .............................. TO2010A0621

(51) Int. Cl.
| C08K 5/07 | (2006.01) |
| C08K 3/10 | (2006.01) |
| B82Y 30/00 | (2011.01) |
| C08J 3/20 | (2006.01) |
| C08K 3/26 | (2006.01) |
| C08J 5/00 | (2006.01) |

(52) U.S. Cl.
CPC ................ *B82Y 30/00* (2013.01); *C08J 3/201* (2013.01); *C08K 3/26* (2013.01); *C08K 2201/011* (2013.01); *C08J 5/005* (2013.01); *C08J 2323/12* (2013.01); *Y10S 977/773* (2013.01)
USPC ............................ 524/357; 524/403; 977/773

(58) Field of Classification Search
CPC ........ C08J 5/005; C08J 2323/12; C08J 3/201; C08K 3/26; C08K 2201/011; B82Y 30/00
See application file for complete search history.

(56) References Cited

U.S. PATENT DOCUMENTS

2010/0008854 A1    1/2010    Haam et al.

FOREIGN PATENT DOCUMENTS

| EP | 1695995 | 8/2006 |
| WO | WO 2009068365 A2 * | 6/2009 |

OTHER PUBLICATIONS

Stanimirova et al., "Thermal decomposition products of hydrotalcite-llike compounds: low-temperature metaphases," J. Mater. Sci., 34 (1999) 4153-4161.*
International Search Report for PCT/IB2010/053077 mailed Sep. 23, 2011.
Written Opinion of the International Searching Authority mailed Sep. 23, 2011.
Ushakov N M et al., "Nanocomposites Based on the Cerium Oxide Nanoparticles and Polyethylene Matrix: Syntheses and Properties", ACTA Materialia, Elsevier, Oxford, GB, vol. 56, No. 10, Jun. 1, 2008, pp. 2336-2343.
Kosobudsky I D et al., "Synthesis and Structure of Polyethylene-Matrix Composites Containing Zinc Oxide Nanoparticles", Inorganic Materials, Nauka/Interperiodica, MO., vol. 41, No. 11, Nov. 1, 2005, pp. 1172-1177.
Yoda S et al., "Preparation of a Platinum and Palladium/Polyimide Nanocomposite Film as a Precurser of Metal-Doped Carbon Molecular Sieve Membrane Via Supercritical Impregnation", Chemistry of Materials Jun. 15, 2004 American Chemical Society US, vol. 16, No. 12, Jun. 15, 2004, pp. 2363-2368.
Gubiun S P et al., "Nanomaterials Based on Metal-Containing Nanoparticles in Polyethylene and Other Carbon-Chain Polymers", International Journal of Materials and Product Technology 2005 Inderscience Enterprises Ltd., CH, vol. 23, No. 1-2, 2005, pp. 2-25.
Tang J et al., Effects of Organic Nucleating Agents and Zinc Oxide Nanoparticles on Isotactic Polypropylene Crystallization, Polymer, Elsevier Science Publishers B.V., GB, vol. No. 7, Mar. 1, 2004, pp. 2081-2091.
Vassiliou et al., "Nanocomposites of Isotactic Polypropylene with Carbon Nanoparticles Exhibiting Enhanced Stiffness, Thermal Stability and Gas Barrier Properties", Composites Science and Technology, Elsevier, UK, vol. 68, No. 3-4, Jan. 30, 2008, pp. 933-943.
Lee J Y et al., "Effect of Metal Nanoparticles on Thermal Stabilization of Polymer/Metal Nanocomposites prepared by a One-Step Dry Process", Polymer, Elsevier Science Publishers B.V., GB, vol. 47, No. 23, Oct. 30, 2006, pp. 7970-7979.
Fordhad Mina MD et al., "Improved Performance of Isotactic Polypropylene/Titanium Dioxide Composites; Effect of Processing Conditions and Filler Content", Polymer Degradation and Stability, Barking, GB, vol. 94, No. 2, Feb. 1, 2009, pp. 183-188.

* cited by examiner

*Primary Examiner* — Ling Choi
*Assistant Examiner* — Catherine S Branch
(74) *Attorney, Agent, or Firm* — Nixon & Vanderhye PC

(57) ABSTRACT

Described herein is a method for producing a nanocomposite material, including nanofillers dispersed in a polymeric matrix. The method comprises the steps of:
a) providing a starting thermoplastic polymeric material, having a crystalline structure;
b) providing one or more precursors of the nanofillers;
c) bringing the starting thermoplastic polymeric material into the molten state and dispersing the precursor or precursors therein;
d) subjecting the precursor or precursors to in situ thermolysis, thereby generating the nanofillers directly within the melted material; and
e) causing solidification of the molten polymeric material including the nanofillers, thereby obtaining the nanocomposite material.
The precursor or the precursors are selected from among carbonates and acetylacetonates and the thermoplastic polymeric material is isotactic polypropylene.

12 Claims, 4 Drawing Sheets

METHOD FOR PRODUCING NANOCOMPOSITE MATERIALS WITH POLYMERIC MATRIX, AND CORRESPONDING NANOCOMPOSITE MATERIALS

This application is the U.S. national phase of International Application No. PCT/IB2011/053077 filed 11 Jul. 2011 which designated the U.S. and claims priority to IT TO2010A000621 filed 19 Jul. 2010, the entire contents of each of which are hereby incorporated by reference.

FIELD OF THE INVENTION

The present invention relates in general to nanocomposite materials having improved mechanical characteristics. More in particular, the invention regards a method for producing materials comprising a polymeric matrix with crystalline structure, dispersed in which are particles of nanometric size. The invention likewise regards the aforesaid nanocomposite materials and use of nanoparticles obtained by in situ thermolysis of precursors in a polymeric matrix of the nanocomposite itself.

STATE OF THE ART

A composite material is the result of the combination of at least two different components. When at least one of the components has a size of the order of nanometers, said material is referred to as "nanocomposite material".

The addition of nanofillers to a polymeric matrix is traditionally aimed at improving the performance of the latter, taking advantage of the nature and the characteristics proper to nanometric fillers. This approach presupposes that the nanofillers are adequately dispersed in the matrix and that the properties of the nanofillers are different or improved as compared to those of the matrix.

In order to incorporate nanofillers in polymeric matrices, ex situ methods are traditionally used. Said methods envisage the dispersion of pre-synthesized nanoparticles in a polymeric matrix in the molten state. This approach presupposes that the polymeric matrix is rendered compatible—via purposely provided additives—with the nanofillers previously synthesized, and that the nanofillers are subjected to surface treatments in order to optimize the nanofiller/polymer interface.

This traditional approach presents an important drawback, represented by the fact that the nanofillers introduced into the molten polymeric matrix—with a mass density typically of between 0.1% and 3%—tend to aggregate. For this reason, further chemical additives must be added to the matrix, aimed at causing disgregation of the "lumps" of nanofillers and enabling the polymeric chain to be interspersed with the nanofillers themselves, which are completely exfoliated into individual elementary units. This interspersion is essential in order for the nanofillers to contribute effectively to enhancing the final properties of the polymeric matrix.

However, today, the best examples of nanocomposite polymeric matrices present a clear limit in the concentration of the nanofillers that can be totally exfoliated, and consequently enable the polymeric chains of the matrix to be interspersed with the individual fillers and preserve their nanoscopic nature, which would be lost if they remained aggregated. In particular, with carbon nanotubes (CNTs), it has been noted that at densities higher than 0.1 wt % the mechanical properties do not improve, and this suggests that CNTs with higher densities start to aggregate. Hence, in the specific case, above the aforesaid threshold, the nanofillers cannot be considered exfoliated, and consequently of nanometric size.

SUMMARY OF THE INVENTION

The object of the invention is to obtain a new methodology of production that will enable improvement—in the first place—of the mechanical characteristics of thermoplastic polymers with crystalline structure, in a simple and inexpensive way. A correlated object of the invention is to provide nanocomposite materials with a crystalline thermoplastic polymeric matrix having improved mechanical properties.

The above and yet other objects, which will emerge more clearly hereinafter, are achieved, according to the present invention, by a method for the production of a nanocomposite material as per the annexed claims. The claims form an integral part of the technical teaching provided herein in relation to the invention.

In summary, the invention envisages a method for producing a nanocomposite material, including nanofillers dispersed in a thermoplastic polymeric matrix. The method comprises the steps of:

a) providing a starting thermoplastic polymeric material, having crystalline structure;

b) providing one or more precursors of the nanofillers, in particular one or more organic and/or metallorganic precursors;

c) bringing the starting thermoplastic polymeric material into the molten state and dispersing the precursor or precursors therein;

d) subjecting the precursor or precursors to in situ thermolysis, or thermal decomposition, thereby generating the nanofillers directly within the thermoplastic polymeric material into the molten state; and e) causing solidification of the molten polymeric material including the nanofillers, thereby obtaining the nanocomposite material, wherein the precursor or the precursors are selected from carbonates and acetylacetonates and the thermoplastic polymeric material is preferably isotactic polypropylene.

The method according to the invention thus envisages in situ thermolysis or thermal decomposition, directly within the isotactic polypropylene in the molten state, of appropriate precursors, for example in the form of commercial powders. Following upon thermolysis, said precursors are divided in a metal or ceramic solid part and a light organic part, where the solid part constitutes nanoparticles within the polymeric matrix.

As compared to ex situ techniques, the in situ methodology is relatively simpler and, above all, guarantees a better dispersion of the nanofillers generated in situ in the molten matrix, without formation of aggregates.

The size of the nanoparticles formed in situ depends upon the kinetics of the chemical reaction and upon the physical/chemical characteristics of the molten matrix (in the first place upon its viscosity), which can be readily adapted via the parameters of the process of melting of the material. For example, in the case of extrusion, the thermal profile will be distinguished by different temperatures at different rates of extrusion in different parts of the extrusion path, according to the precursor used.

The concentration in weight of the precursor, which can be indicatively comprised between 0.1 wt % and 50 wt %, is chosen in such a way that the crystallites of the polymeric matrix of the nanocomposite material will have a size of between 100 μm and 100 nm, preferably between 50 μm and 50 nm.

The solution according to the invention proves extremely flexible, since different precursors can be split via thermal treatments to form nanofillers in situ, and a plurality of different nanofillers can be possibly synthesized in situ in the matrix of polypropylene.

The temperature of thermolysis of the at least one chosen precursor is preferably lower than the degradation temperature of the matrix polymer, i.e. isotactic polypropylene, as well as higher than its melting temperature so as to enable homogeneous mixing thereof in the matrix and complete transformation into nanoparticles.

The invention enables improvement of the mechanical properties of the polypropylene, and in particular an increase in stiffness and strength thereof, with a reduction in thermal expansion thereof and an increase in creep, ultimate strength, and yield thereof.

DESCRIPTION OF PREFERRED EMBODIMENTS OF THE INVENTION

Figure 1:
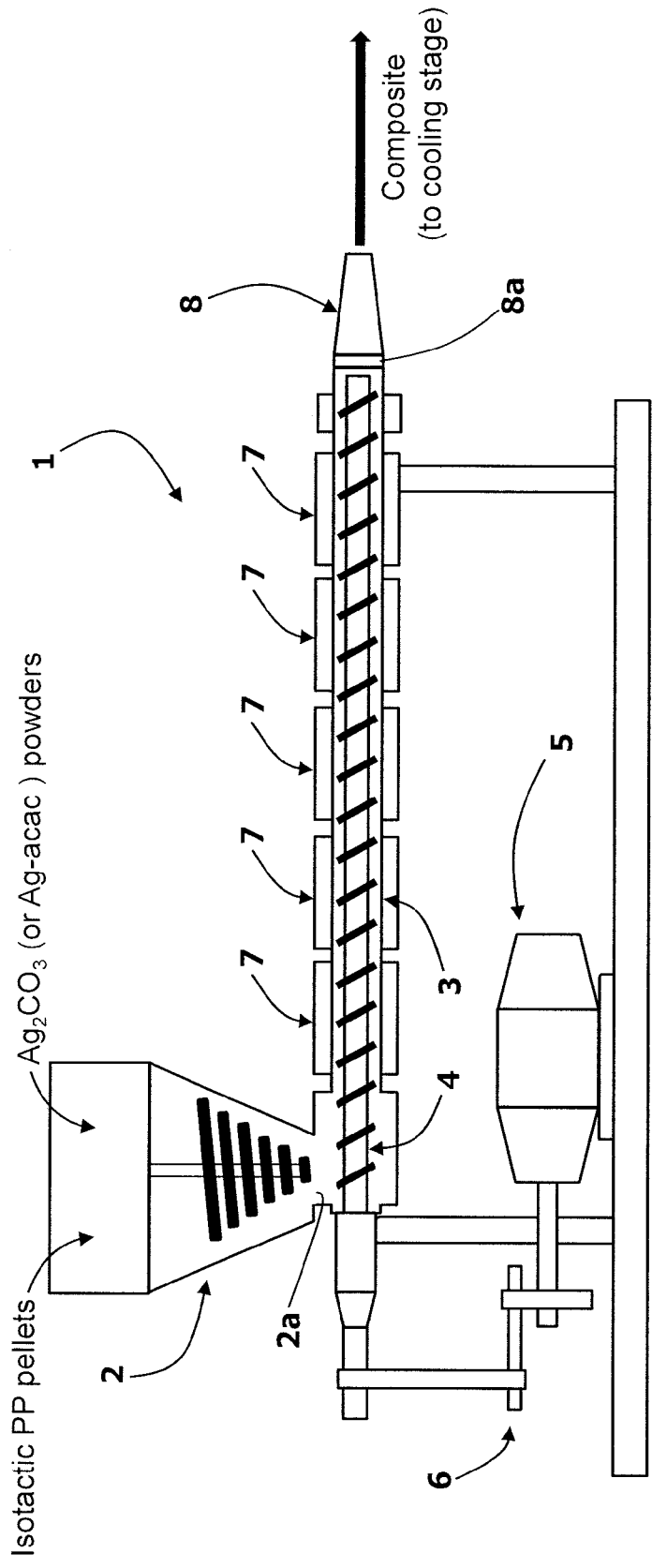
FIG. 1 is a schematic representation of an extruder that can be used for the purposes of implementation of the invention.

In situ synthesis of nanoparticles in a polymeric matrix has already been proposed for the production of nanocomposites, particularly in combination with thermosetting polymers, such as epoxy resins. Basically, the molten thermosetting polymeric mass, contained in a container, is mixed with a precursor in powder form of the nanofiller of interest. By applying an adequate temperature profile, in the molten mass there is brought about thermolysis of the precursor, i.e., a chemical reaction whereby the precursor is separated into a solid part, which provides the nanoparticles, and a by-product, which is removed.

The in situ technique has already been proposed for obtaining nanocomposites, but with thermosetting polymeric matrices, and in combination with precursors that do not react with the matrix: given that thermosetting materials present excellent intrinsic mechanical characteristics, the perspective has been that of providing the polymeric matrix with characteristics proper to nanofillers, for example to improve thermal or electrical conductivity thereof, by varying the colouring thereof, the plasmonic absorption, the degree of electromagnetic shielding, and the optical properties.

Like other solid-state materials, polymers can have an amorphous or else a crystalline molecular structure. The amorphous structure is typical of the molten state. However, by controlling the rate of cooling or intervening with purposely provided promoters, some polymers solidify in the crystalline form owing to the alignment and/or packing of their macromolecules.

The areas of the polymer that are organized in the crystalline form are referred to as "crystallites". In some plastic materials the crystallites englobe amorphous areas, thus constituting structures referred to as "spherulites". It is known, in this regard, that polymers that are able to crystallize do not always reach a perfect crystalline order and are hence referred to as "semicrystalline polymers". In the present description and in the attached claims, consequently, terms such as "crystalline" and the like are meant to designate also "semicrystalline" structures.

Thermosetting polymers, such as epoxy resins, are typical examples of amorphous polymers.

Typical crystalline polymers are, instead, isotactic polymers, for example polypropylene.

Thermosetting polymers are characterized by unsaturated chains and by a lattice structure that they assume at the moment of production. A possible subsequent heating has the effect of breaking the crosslinks that stabilize the structure, causing an irreversible alteration thereof.

Instead, thermoplastic polymers are characterized by polymeric chains that are for the most part linear and without unsaturated bonds. When they are heated above room temperature, they soften and finally break at a temperature to which there corresponds the maximum freedom of movement for their macromolecules. This behaviour is reversible and, consequently, unlike thermosetting polymers, thermoplastic polymers can be easily hot modelled.

Consequently, according to the invention, in a molten matrix of isotactic polypropylene the technique of formation in situ by thermolysis of nanofillers is used, and this enables arbitrary concentrations of nanofillers, even ones higher than 50 wt %, to be dispersed in a homogeneous way in the matrix.

In principle, the density of the nanoparticles in volume occupied can be between 0.01% and 50% of the polymeric matrix, even though it is clear that the greater the amount of filler, the heavier the weight of the final composite. Preferred densities are hence lower than 30%, for example 4-6%.

The size and shape of the nanoparticles can be established beforehand, for example by controlling precisely (fractions of degree centigrade) the profile of the temperature of extrusion (along an extrusion screw) and/or of injection (in a mould, in the case where it is desired to carry out thermolysis in the moulding step). In fact, the form of the temperature profile is strictly correlated to the intrinsic kinetics of reaction of the precursor (i.e., when the precursor is in free space), to the density and viscosity of the matrix polymer, and consequently to the kinetics of reaction of the precursor when immersed in a matrix polymer. For the purposes of implementation of the invention, the average size of the nanofillers may indicatively be between 1 nm and 100 nm.

The precursors usable for the purposes of implementation of the invention are the carbonates and the acetylacetonates. Said precursors enable to satisfy the following requirements:

a) possibility of homogeneous disgregation of the precursor powders into single elementary micrometric and sub-micrometric grains, within the polymeric matrix in the molten state, possibly with the aid of suitable chemical solvents (for example, chloroform, if the synthesis is performed on a hot-plate, typically by casting, or else no solvent, in the case of extrusion); the disgregation must occur in a temperature range comprised between the melting temperature of the thermoplastic polymeric matrix and its degradation temperature;

b) possibility of disgregation of the powders of precursor in a temperature range comprised between the melting temperature of the matrix polymer and the temperature of thermolysis of the precursor;

c) onset of thermolysis in a temperature range comprised between the melting temperature of the thermoplastic polymeric matrix and its degradation temperature;

d) in situ generation of nanoparticles that are stable—in terms of structure, shape, and size—in a temperature range comprised between the melting temperature of the starting thermoplastic polymer and its degradation temperature.

Amongst the various thermoplastic and crystalline polymers, the invention is particularly directed the isotactic polypropylene, such as the one known by the trade name MOPLEN® manufactured by Basell Polyolefins, which is widely used in the automotive sector.

The elements that can be aggregated into carbonates and acetylacetonates, which can be used in principle as precursors for the formation in situ of the nanofillers envisaged according to the invention are the following: lithium, beryllium, sodium, magnesium, potassium, calcium, rubidium, strontium, cesium, barium, manganese, iron, cobalt, nickel, copper, zinc, silver, cadmium, thallium, lead, and lanthanum.

In this context, carbonates are particularly interesting, since they simply generate $CO_2$ as by-product, which, since it is volatile, evaporates during thermolysis without affecting the final mechanical characteristics of the nanocomposite.

To provide a deeper understanding of the invention, described hereinafter is the case of nanoparticles of silver oxide ($Ag_2O$), originated via in situ thermolysis of silver carbonate ($Ag_2CO_3$). Silver oxide has a negative coefficient of thermal expansion (NTE), which is useful for reducing the overall thermal expansion of the final nanocomposite.

In order to test the validity of the invention, the present applicant has hence produced specimens of a nanocomposite with isotactic thermoplastic polymeric matrix for application in the automotive sector, for example, for producing dashboards, bumpers, door panels, etc. The process of thermolysis was carried out in the course of a melt extrusion of the nanocomposite material.

FIG. 1 is a schematic illustration of an extruder of the type used for the purposes of implementation of the invention. The extruder exemplified comprises a feeding and pre-mixing hopper 2, the outlet 2a of which is in communication with a hollow cylinder 3, turning within which is an wormscrew 4. The wormscrew 4 is actuated via an electric motor 5 and a corresponding reducer 6. The cylinder 3 is divided into various areas, each provided with resistors 7 that can be controlled for maintaining a desired temperature. It should be noted that these temperatures are not the same as that of the plastic material within the cylinder 3, but are selected according to the requirements of the area. On the walls of the cylinder 3, in the proximity of the flow of plastic material, temperature sensors are provided, not represented, connected to thermoregulators, not represented either.

The starting polymeric material in bulk solid form (for example, in pellets or grains) is introduced into the hopper 2 together with the precursor of interest in bulk form (for example, in powder), and, as it advances along the cylinder 3 pushed by the wormscrew 4, reaches melting point. Preferably, the process is carried out without the addition of mineral oil.

The heat is principally generated by the friction created by the rotation at high speed of the wormscrew 4 immersed in the plastic mass, and hence the majority of the energy responsible for melting comes from the friction caused by rotation of the screw, and not just from the elements heating 7 set along the cylinder 3. The action of the wormscrew 4 affords a high degree of mixing or dispersion of the precursor macromolecules in the fluid mass. The molten polymer is pushed, once again by rotation of the wormscrew 4, towards the final part 8 of the extruder 1, referred to as head or die, possibly provided with a filter 8a. The head 8 is provided with an opening of an appropriate shape, through which the composite exits from the apparatus. The shape of this opening determines the cross section of the extruded material. Once it has come out of the head 8, the material is pushed through an area or stage where it is cooled (by air, water, or contact with a metal), and then rolled or cut to the desired shape.

In the example described herein, the starting polymer for obtaining the matrix was constituted by isotactic polypropylene Moplen HP 400R (density 0.90 g/cm$^3$, flowrate of the molten mass 25 g/10 min, melting point Tm=161° C.), purchased from Albis Plastic Scandinavia AB (Sweeden). The starting polymer, in the form of pellets, was supplied to the extruder together with powder of silver carbonate ($Ag_2CO_3$), produced by the present applicant, in an amount of 4 wt %, and without any addition of mineral oil or other additives and/or solvents.

Tests carried out (microscopic analyses before and after thermal treatment, elementary energy-dispersive spectrometric (EDS) analyses), showed that the requirements a) and d) set forth previously are met using the precursor indicated.

As regards the requirements b) and c), thermogravimetric analyses (TGAs) and differential scanning calorimetries (DSCs) were conducted.

Figure 2:
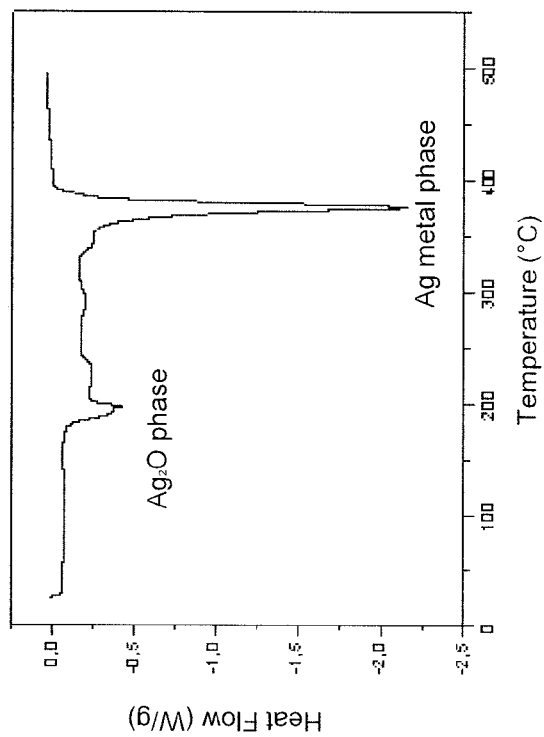
FIGS. 2 and 3 are graphic representations of the results of a thermogravimetric analysis and a differential scanning calorimetry, respectively, for a first precursor of nanoparticles that can be used for the purposes of implementation of the invention, aimed at illustrating the intrinsic kinetics of reaction of the precursor (i.e., with the precursor in free space)
Figure 3:
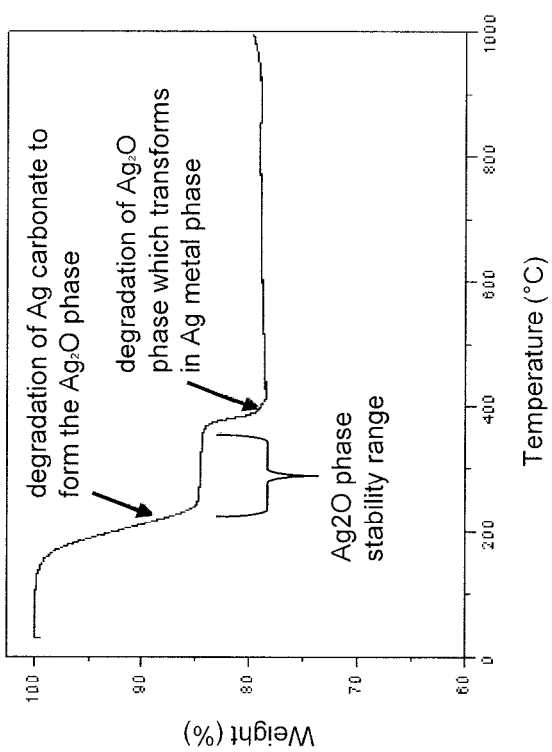
Figure 4:
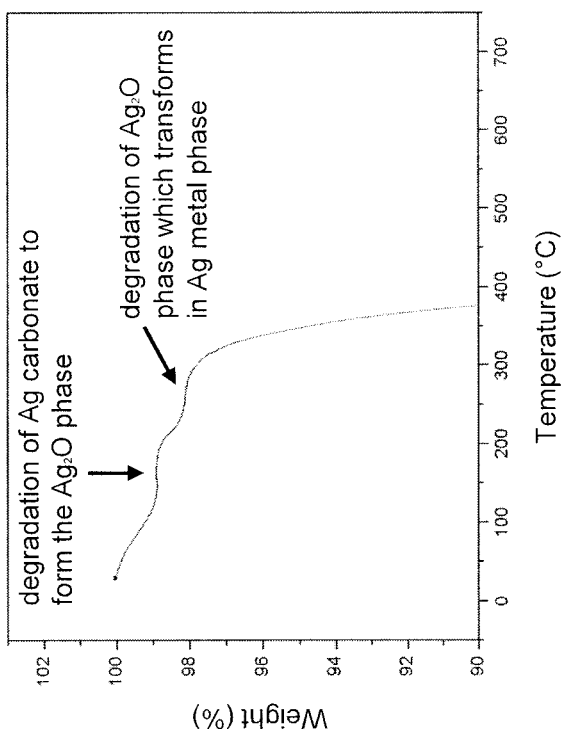
FIGS. 4 and 5 are graphic representations of the results of a thermogravimetric analysis and a differential scanning calorimetry, respectively, of the same precursor as that of FIGS. 2 and 3, in a corresponding crystalline thermoplastic polymeric matrix in the molten state.
Figure 5:
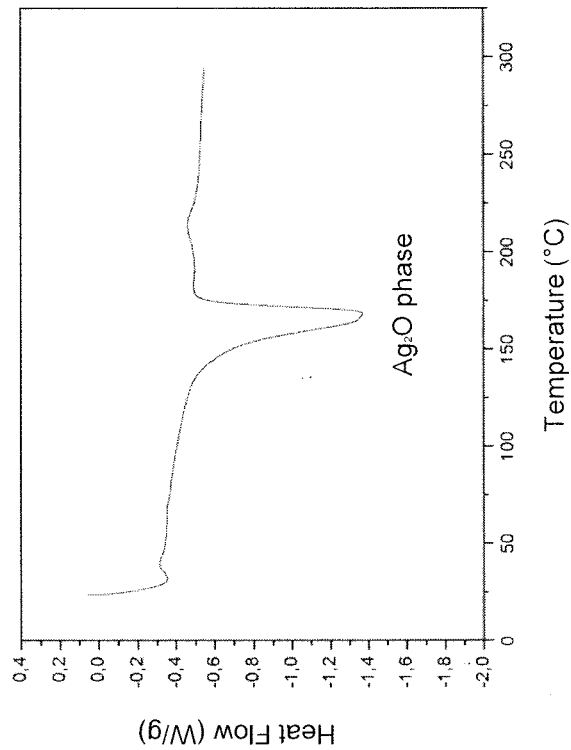

FIGS. 2-3 are graphic representations of the results of TGAs and DSCs of silver carbonate carried out in free space, i.e., not in the polymeric matrix, whereas FIGS. 4 and 5 are the results of TGAs and DSCs regarding effective use as precursor of silver carbonate dispersed in the matrix of molten isotactic polypropylene. From these graphs it is possible to localize the ranges of temperature within which the specific chemical reactions occur.

With reference to the graphs of FIGS. 2 and 3 it emerges how silver carbonate forms by thermolysis silver-oxide nanoparticles at a temperature comprised between approximately 220° C. and approximately 410° C. By increasing the temperature, the oxide phase is transformed into metal phase. Via TGA, the measurement of the loss in weight of the specimen—corresponding to the evaporation of gas ($CO_2$)—indicates onset of a chemical reaction.

Silver carbonate is a precursor that is particularly suitable for in situ synthesis of nanofillers of silver oxide given that the transition from the oxide phase to the metal phase is not immediate. As is clearly highlighted in FIG. 2, silver carbonate presents in fact a stable stretch within its TGA curve, between the temperature of formation of the silver-oxide nanoparticles and their temperature of degradation into metal. This behaviour may be detected also from the DSC of FIG. 3.

The chemical reaction that occurs at the temperature of formation of the silver-oxide nanofillers, using as precursor silver carbonate, is the following: $Ag_2CO_3 \rightarrow Ag_2O + CO_2$ (at approximately 228° C.)

FIGS. 4 and 5 show TGAs and DSCs obtained with silver carbonate dispersed in the molten isotactic polypropylene, indicated as starting polymer for the matrix. As may be seen, the pattern of the profiles appearing in the graphs of FIGS. 4 and 5 is basically similar to that of the graph of FIGS. 2-3, confirming the behaviour of the precursor in question also when mixed in the molten polymeric matrix, even though at temperatures of reaction slightly different from the case of precursor in free space.

The behaviour exemplified for silver carbonate is substantially similar (obviously at different temperatures) for all the carbonates of the elements indicated previously.

Figure 7:
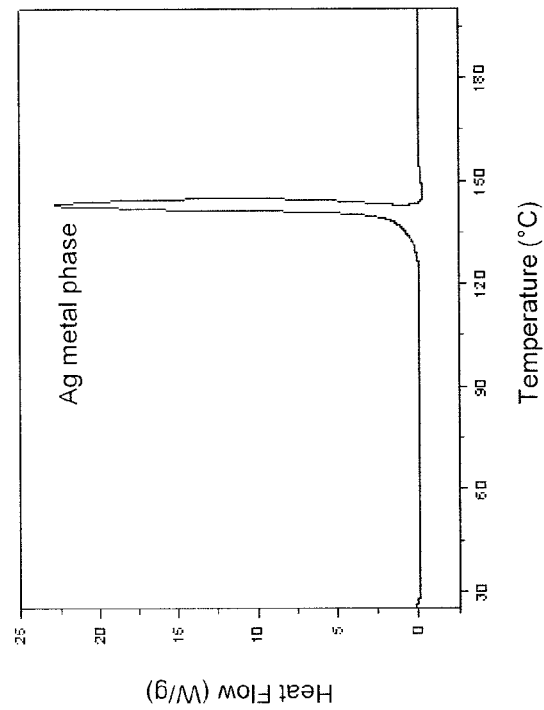
FIGS. 6 and 7 are graphic representations of the results of a thermogravimetric analysis and a differential scanning calorimetry, respectively, for a second precursor of nanoparticles that can be used for the purposes of implementation of the invention, also in this case with the precursor in free space.
Figure 6:
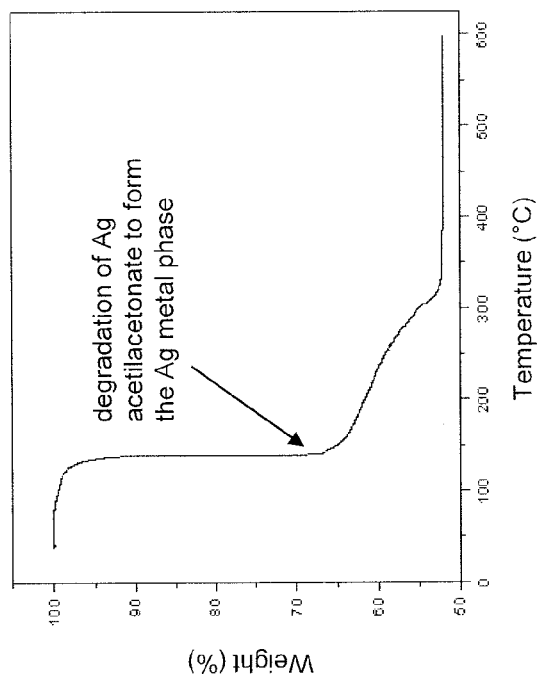

FIGS. 6 and 7 are graphic representations of the results of TGAs and DSCs of silver acetylacetonate in free space (i.e., not in the polymeric matrix).

Silver acetylacetonate forms by thermolysis silver nanoparticles at a temperature substantially comprised between 150° C. and 250° C. (within which range silver acetylacetonate decomposes into acetyl peroxide and metal silver).

Even though this cannot be completely appreciated from the graph of FIG. 6, there is a narrow range of temperatures in which silver acetylacetonate reacts and forms silver nanoparticles. FIG. 7 shows the DSC for the same precursor. The peak appearing in the graph shows in a more precise way the narrow temperature range in which acetylacetonate degrades to form the silver nanoparticles.

From a comparison between the graphs of FIGS. 2-3, on the one hand, and of FIGS. 4-5, on the other, it emerges how thermolysis of silver carbonate in free space does not differ significantly from the thermolysis that occurs within the molten polymeric matrix. On the above basis, it is hence more than reasonable to conclude that a similar behaviour occurs in the case of silver acetylacetonate, i.e., that its thermolysis in the molten polymeric matrix does not diverge significantly from what is highlighted in the graphs of FIGS. 6 and 7. In effect, the present applicant has verified the thermolysis of silver acetylacetonate in the reference isotactic polypropylene, obtaining in situ synthesis of silver nanoparticles completely distributed in space (practically 100% of exfoliation). Also in this case, similar formation paths are followed (even though at different temperatures) for all the acetylacetonates of the elements indicated previously.

The in situ synthesis according to the invention enables nanoparticles densely dispersed to be obtained, in a crystalline thermoplastic polymeric matrix, also possibly different from isotactic polypropylene.

The practical tests conducted by the present applicant have made it possible to ascertain that the methodology according to the invention enables a significant improvement of the mechanical characteristics of the polypropylene matrix nanocomposite to be obtained, in terms of stiffness, strength, reduction of thermal expansion, as well as increase of creep, ultimate strength, and yield, as compared to the matrix polymer without fillers.

Said results were obtained also with densities of nanofillers in the molten polymeric matrix higher than those traditionally used in ex situ methods. It was, for example, noted that, also with densities of 4%, a complete interspersion of the polymeric chain between the nanofillers can be achieved; this results in a multitude of nanoparticles all completely separated from one another in the matrix polymer. In the testing conditions (4% of silver carbonate in isotactic polypropylene), spherulites were obtained of a size smaller than 10 μm. Mechanical tests of elongation conducted with this specific nanocomposite showed the improvement of the mechanical characteristics referred to above (stiffness, toughness, and creep), as expected. It was moreover noted that the particles of silver oxide thus formed were prevalently arranged at the boundaries of the spherulites.

From the latter observation, it is reasonable to conclude that the in situ nucleation of nanoparticles in the crystalline polymeric matrix enables control of the crystalline structure of the final nanocomposite, as compared to the structure of the starting thermoplastic polymer of the matrix, and in particular reduction to some microns, and down to some tens of nanometers, of the characteristic dimensions of the crystallites as compared to those that can be obtained by means of similar temperature profiles without the presence of the nanoparticles (the typical size of the crystallites in the absence of nanoparticles are of the order of tens or hundreds of microns).

Said hypothesis is based upon the consideration that the size of the crystallites is linked to the mechanical properties of the material: it is not by any chance that improved mechanical properties are encountered in materials having crystallites of small size. Once again in order to improve the mechanical properties thereof, according to the current state of the art, the morphology of the crystallites can be controlled by the conditions of solidification by subjecting the mass being processed to appropriate thermal profiles, for example to a fast cooling of the polymer in the molten state in the course of extrusion.

To provide a specific example of how currently the size of the spherulites can be controlled, consider the case of an isotactic polymer, such as isotactic polypropylene. In the course of crystallization, such a polymer forms crystallites having a substantially spherical configuration, i.e., spherulites that are constituted by an alternation of crystalline and amorphous areas. The crystalline areas assume the form of lamellae, elongated in the direction of the radius of the sphere, which depart radially from the centre of the sphere itself and alternate with the amorphous areas. During solidification of the material there occurs primary nucleation, with the formation of the first seed of lamella. This is followed by the secondary nucleation, with folding of the chain and formation of a new lamella according to a spherical growth to form a fibril. As this process proceeds the spherulite is formed; as the spherulites grow, they can encounter one another and increase in size.

The rate of nucleation and the rate of growth of the spherulites are linked in a different way to the crystallization temperature.

To clarify the concept, consider the case of one and the same isotactic polymer made to crystallize at two different temperatures, a higher one and a lower one. If the polymer is made to crystallize at the higher temperature, the rate of nucleation of the spherulites is low (a few crystallization nuclei per unit time are formed), whereas the rate of growth is high: in this case "large" spherulites are formed. By causing the same polymer to crystallize at the lower temperature, the rate of nucleation is high, whereas the rate of growth is low: in this case, per unit time many nuclei are formed that grow slowly, and the result is a fine spherulitic morphology.

It is on this basis that, at the current state of the art, the size of the spherulites of a thermoplastic polymer can be controlled to a certain extent. At the current state of the art, in isotactic thermoplastic polymers, the crystallites can reach a minimum size of the order of 100 μm$^2$, or else have a diameter ranging from a few microns to some tens of microns, in the case where the polymer crystallizes with spherulites.

On the basis of the observations of the present applicant, it is reasonable to conclude that the method according to the invention enables countering of the growth in size of the spherulites, not by means of particular thermal profiles (that slow down the production process), but rather thanks to the direct generation of the nanoparticles in the molten polymer. On the basis of this hypothesis, the nanoparticles generated in situ act as defects of the crystallization path, which slow down the process: very schematically, when a spherulite encounters a defect (a nanofiller) in the course of its growth, the crystalline order is interrupted and a new spherulite is nucleated, or an adjacent spherulite grows in its stead: this could explain why, in the observations of the present applicant, the nanofillers are located at the boundaries of the spherulites.

According to said hypothesis, thanks to the presence of the densely dispersed nanofillers, the crystallites of thermoplastic matrix would come to have a size smaller than that of the crystallites of the structure of the starting thermoplastic material.

According to said approach, the possibility of limiting, or determining, the growth of the spherulites by nucleating nanoparticles within the molten polymeric matrix enables elimination of the thermal profiles used for the purpose according to the current state of the art. Since thermal exchanges—however much the system may be optimized in the design stage—slow down the process of production and in effect increase the costs of the material thus produced, limitation of the growth of the spherulites by means of nanoparticles nucleated in situ appears to the present applicant an advantage that has a significant impact on the production costs.

On the basis of said hypothesis, it would be consequently possible to adapt the shape and size of the crystallites or spherulites by generating in situ nanoparticles at substantially definite distances from one another, thereby determining the lateral dimension of the crystallites or the diameter of the spherulites in the course of their creation. On the hypothesis where the nanoparticles are nucleated in a substantially homogeneous way in the matrix, controlling the density in weight of the precursor means controlling the average distance between the nanoparticles, once they have been generated. Consequently, the concentration in weight of the precursor or precursors added to the starting polymeric material could be chosen in such a way that, following upon solidification of the molten polymeric material including the nanofillers, the crystalline structure of the polymeric matrix of the nanocomposite material will come to include crystallites having a size smaller than the size of the crystallites of the starting thermoplastic polymeric material.

Hence, according to the hypothesis formulated herein, it would be possible to obtain control of the distances between the nanoparticles, or control of the size of the crystallites of the matrix of the nanocomposite.

Irrespective of the hypothesis here formulated, however, the evident advantages of the invention as compared to the known art are the following:

- neither compatibilized agents or mineral oil nor a surface pre-treatment of the nanoparticles are required;
- there is no upper theoretical limit of concentration of the nanoparticles; and
- the aggregation of nanoparticles is prevented without the use of chemical additives, and the interspersion of each individual nanoparticle with the polymeric matrix is consequently guaranteed.

Finally, it is clear that the solution proposed also enables simultaneous use of a number of different precursors, via which a plurality of different nanofillers can be nucleated in situ in the thermoplastic polymeric matrix.

The invention claimed is:

1. A method for producing a nanocomposite material, including nanofillers dispersed in a thermoplastic polymeric matrix, the method comprising the steps of:
   a) providing a starting thermoplastic polymeric material, having a crystalline structure;
   b) providing one or more precursors of the nanofillers;
   c) bringing the starting thermoplastic polymeric material into the molten state and dispersing the precursor or precursors therein;
   d) subjecting the precursor or precursors to in situ thermolysis, thereby generating the nanofillers directly within the molten polymeric material; and
   e) causing solidification of the molten polymeric material including the nanofillers, thereby obtaining the nanocomposite material,
   wherein the thermoplastic polymeric material is isotactic polypropylene,
   and wherein the precursor or precursors comprise/comprises acetylacetonates.

2. The method according to claim 1, wherein steps c) and d) are carried out in an extruder.

3. The method according to claim 1, wherein the thermoplastic polymeric material is brought to the molten state without the addition of mineral oil.

4. The method according to claim 1, wherein the precursor or precursors is/are selected from among acetylacetonates of lithium, beryllium, sodium, magnesium, potassium, calcium, rubidium, strontium, cesium, barium, manganese, iron, cobalt, nickel, copper, zinc, silver, cadmium, thallium, lead, and lanthanum.

5. The method according to claim 1, wherein the concentration in weight of the precursor or precursors is such that, following upon step e), the crystallites of the polymeric matrix have a size of between 100 μm and 100 nm.

6. A method for producing a nanocomposite material, including nanofillers dispersed in a thermoplastic polymeric matrix, the method comprising the steps of:
   a) providing a starting thermoplastic polymeric material, having a crystalline structure;
   b) providing one or more precursors of the nanofillers;
   c) bringing the starting thermoplastic polymeric material into the molten state and dispersing the precursor or precursors therein;
   d) subjecting the precursor or precursors to in situ thermolysis, thereby generating the nanofillers directly within the molten polymeric material; and
   e) causing solidification of the molten polymeric material including the nanofillers, thereby obtaining the nanocomposite material,
   wherein the thermoplastic polymeric material is isotactic polypropylene,
   and wherein the precursor or precursors comprise/comprises carbonates.

7. The method according to claim 6, wherein the precursor or precursors is/are selected from among acetylacetonates of lithium, beryllium, sodium, magnesium, potassium, calcium, rubidium, strontium, cesium, barium, manganese, iron, cobalt, nickel, copper, zinc, silver, cadmium, thallium, lead, and lanthanum.

8. The method according to claim 7, wherein steps c) and d) are carried out in an extruder.

9. The method according to claim 7, wherein the thermoplastic polymeric material is brought to the molten state without the addition of mineral oil.

10. The method according to claim 6, wherein the concentration in weight of the precursor or precursors is such that, following upon step e), the crystallites of the polymeric matrix have a size of between 100 μm and 100 nm.

11. The method according to claim 6, wherein the precursor or precursors is/are selected from among carbonates of magnesium.

12. The method according to claim 6, wherein the precursor or precursors is/are selected from among carbonates of nickel.

* * * * *